United States Patent
Blank

(10) Patent No.: US 10,604,121 B2
(45) Date of Patent: Mar. 31, 2020

(54) VEHICLE CAMERA WITH LENS CLEANER

(71) Applicant: MAGNA MIRRORS OF AMERICA, INC., Holland, MI (US)

(72) Inventor: Rodney K. Blank, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 15/613,356

(22) Filed: Jun. 5, 2017

(65) Prior Publication Data

US 2017/0349147 A1 Dec. 7, 2017

Related U.S. Application Data

(60) Provisional application No. 62/346,157, filed on Jun. 6, 2016.

(51) Int. Cl.
*B60S 1/56* (2006.01)

(52) U.S. Cl.
CPC ........................ *B60S 1/56* (2013.01)

(58) Field of Classification Search
CPC ........ B60W 2420/403; B60W 2420/42; B60Y 2400/3015; B60S 1/0848; B60R 2300/207; B60R 2001/1253; B60R 11/04
USPC ..................... 348/148; 359/508; 15/97.1, 15
See application file for complete search history.

(56) References Cited

U.S. PATENT DOCUMENTS

| | | |
|---|---|---|
| 4,157,161 A | 6/1979 | Bauer |
| 5,550,677 A | 8/1996 | Schofield et al. |
| 5,670,935 A | 9/1997 | Schofield et al. |
| 5,949,331 A | 9/1999 | Schofield et al. |
| 6,138,319 A * | 10/2000 | Benoit ................ B60Q 1/26 15/250.001 |
| 6,554,210 B2 | 4/2003 | Holt et al. |
| 6,719,215 B2 | 4/2004 | Drouillard |
| 6,944,908 B2 | 9/2005 | Hoetzer et al. |
| 7,014,131 B2 | 3/2006 | Berning et al. |
| 7,267,290 B2 | 9/2007 | Gopalan et al. |
| 7,532,233 B2 | 5/2009 | Chu |
| 7,965,336 B2 | 6/2011 | Bingle et al. |
| 8,567,963 B1 | 10/2013 | Criscuolo et al. |
| 8,671,504 B2 | 3/2014 | Ono et al. |
| 9,319,637 B2 | 4/2016 | Lu et al. |
| 9,327,689 B2 | 5/2016 | Kikuta et al. |
| 9,645,392 B2 | 5/2017 | Yoshimura |
| 9,880,382 B1 * | 1/2018 | Tippy ................ B60R 11/04 |
| 2003/0090569 A1 | 5/2003 | Poechmueller |
| 2004/0189831 A1 | 9/2004 | Shibatani et al. |
| 2007/0132610 A1 | 6/2007 | Guemalec et al. |

(Continued)

*Primary Examiner* — Xi Wang
(74) *Attorney, Agent, or Firm* — Honigman LLP

(57) ABSTRACT

A camera module for a vehicle vision system for a vehicle includes a camera fixedly disposed at an exterior portion of a vehicle so as to have a field of view exterior of the vehicle. A transparent cover element includes an at least partial cylindrical element that at least partially surrounds the camera with a portion of the transparent cover element disposed in front of a lens of the camera. At least one wiping element engages an exterior surface of said transparent cover element. The transparent cover element is rotatable relative to the camera about a longitudinal axis of the transparent cover element to move portions of the transparent cover element across the at least one wiping element to clean dirt or contaminants from the transparent cover element.

16 Claims, 2 Drawing Sheets

(56) References Cited

U.S. PATENT DOCUMENTS

| | | |
|---|---|---|
| 2007/0273971 A1 | 11/2007 | Waldmann et al. |
| 2008/0170142 A1* | 7/2008 | Kawata .................. G01S 11/12 348/294 |
| 2009/0250533 A1 | 10/2009 | Akiyama et al. |
| 2011/0073142 A1 | 3/2011 | Hattori et al. |
| 2011/0181725 A1* | 7/2011 | Matsuura ............... G03B 17/02 348/148 |
| 2011/0266375 A1 | 11/2011 | Ono et al. |
| 2011/0292212 A1 | 12/2011 | Tanabe et al. |
| 2011/0310293 A1* | 12/2011 | Yamauchi .............. G03B 15/00 348/373 |
| 2012/0117745 A1 | 5/2012 | Hattori et al. |
| 2013/0092758 A1 | 4/2013 | Tanaka et al. |
| 2013/0146577 A1 | 6/2013 | Haig et al. |
| 2013/0209079 A1* | 8/2013 | Alexander ............. B60R 11/04 396/25 |
| 2013/0255023 A1 | 10/2013 | Kikuta et al. |
| 2013/0300869 A1 | 11/2013 | Lu et al. |
| 2013/0319486 A1 | 12/2013 | Kikuta et al. |
| 2014/0060582 A1 | 3/2014 | Hartranft et al. |
| 2014/0104426 A1 | 4/2014 | Boegel et al. |
| 2014/0232869 A1 | 8/2014 | May et al. |
| 2015/0138357 A1 | 5/2015 | Romack et al. |
| 2015/0183404 A1 | 7/2015 | Romack et al. |
| 2015/0344001 A1 | 12/2015 | Lopez Galera et al. |
| 2016/0264064 A1 | 9/2016 | Byrne et al. |
| 2016/0272163 A1 | 9/2016 | Dreiocker et al. |

\* cited by examiner

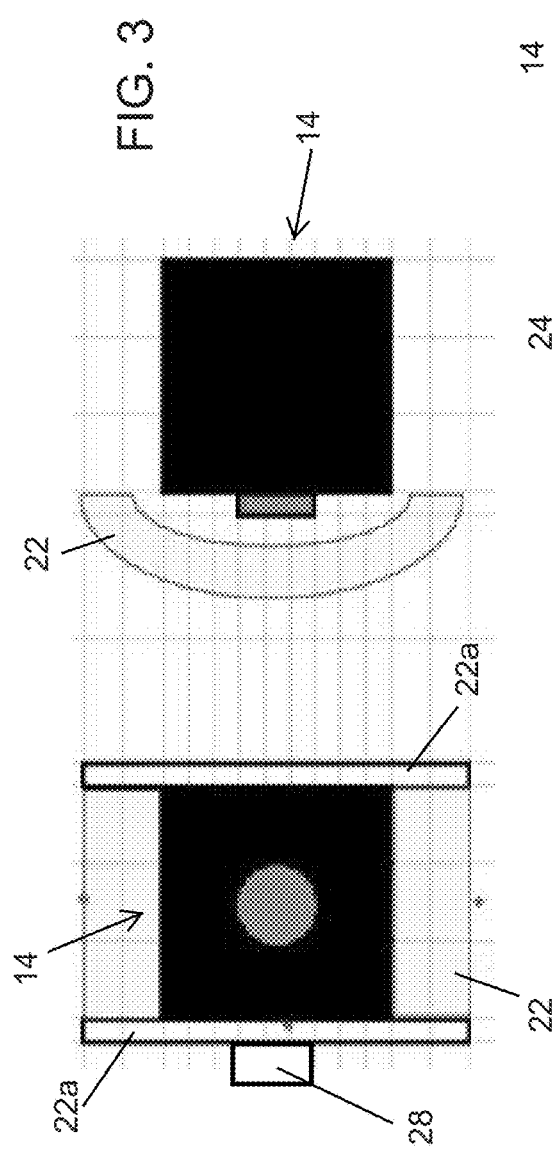
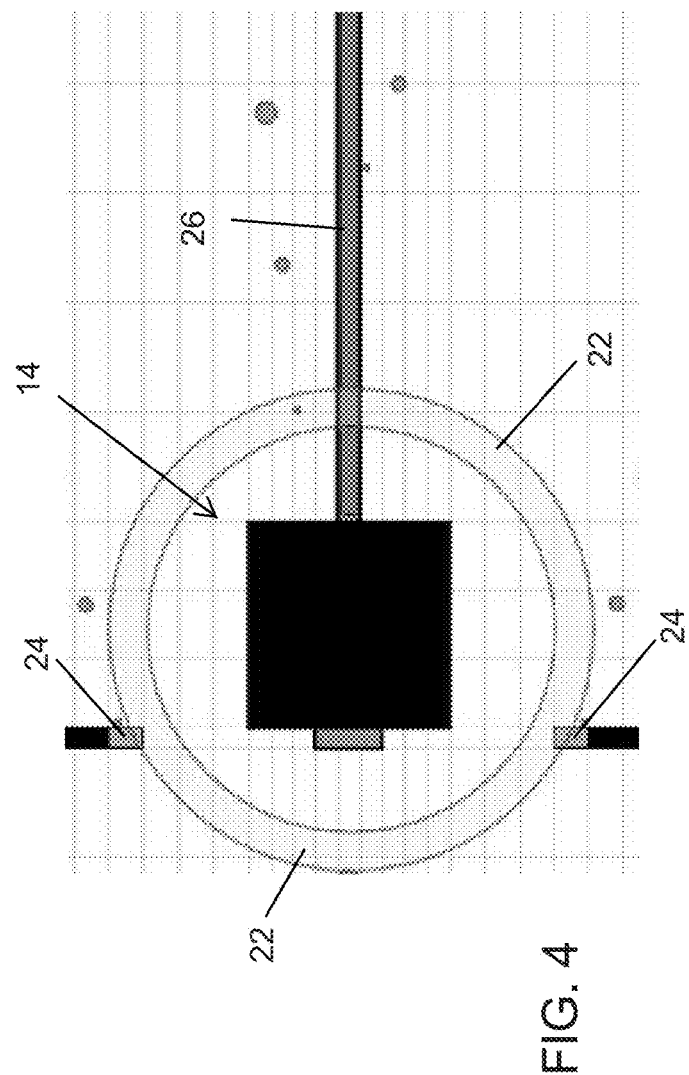
FIG. 2
FIG. 3
FIG. 4

VEHICLE CAMERA WITH LENS CLEANER

CROSS REFERENCE TO RELATED APPLICATION

The present application claims the filing benefits of U.S. provisional application Ser. No. 62/346,157, filed Jun. 6, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a lens cleaner that moves a lens or cover element in front of the camera relative to at least one wiping or cleaning element to clean or clear dirt or debris from the lens or cover element. The lens or cover element comprises a generally cylindrical (or partial cylinder) element or may comprise a generally spherical (or partial sphere) element that is rotatable or pivotable to move different portions of the cover element across a wiping element and then in front of and in the field of view of the camera.

These and other objects, advantages, purposes and features of the present invention will become apparent upon review of the following specification in conjunction with the drawings.

BRIEF DESCRIPTION OF THE DRAWINGS

FIG. 2 is an end view of an exterior camera of a vehicle vision system;

FIG. 3 is a side view of the exterior camera of FIG. 2; and

FIG. 4 is a side view of the exterior camera, showing a transparent lens or cover that partially surrounds the camera and can rotate or pivot or move relative to the camera and relative to wiper elements to clean the lens or cover in accordance with the present invention.

DESCRIPTION OF THE PREFERRED EMBODIMENTS

Figure 1:
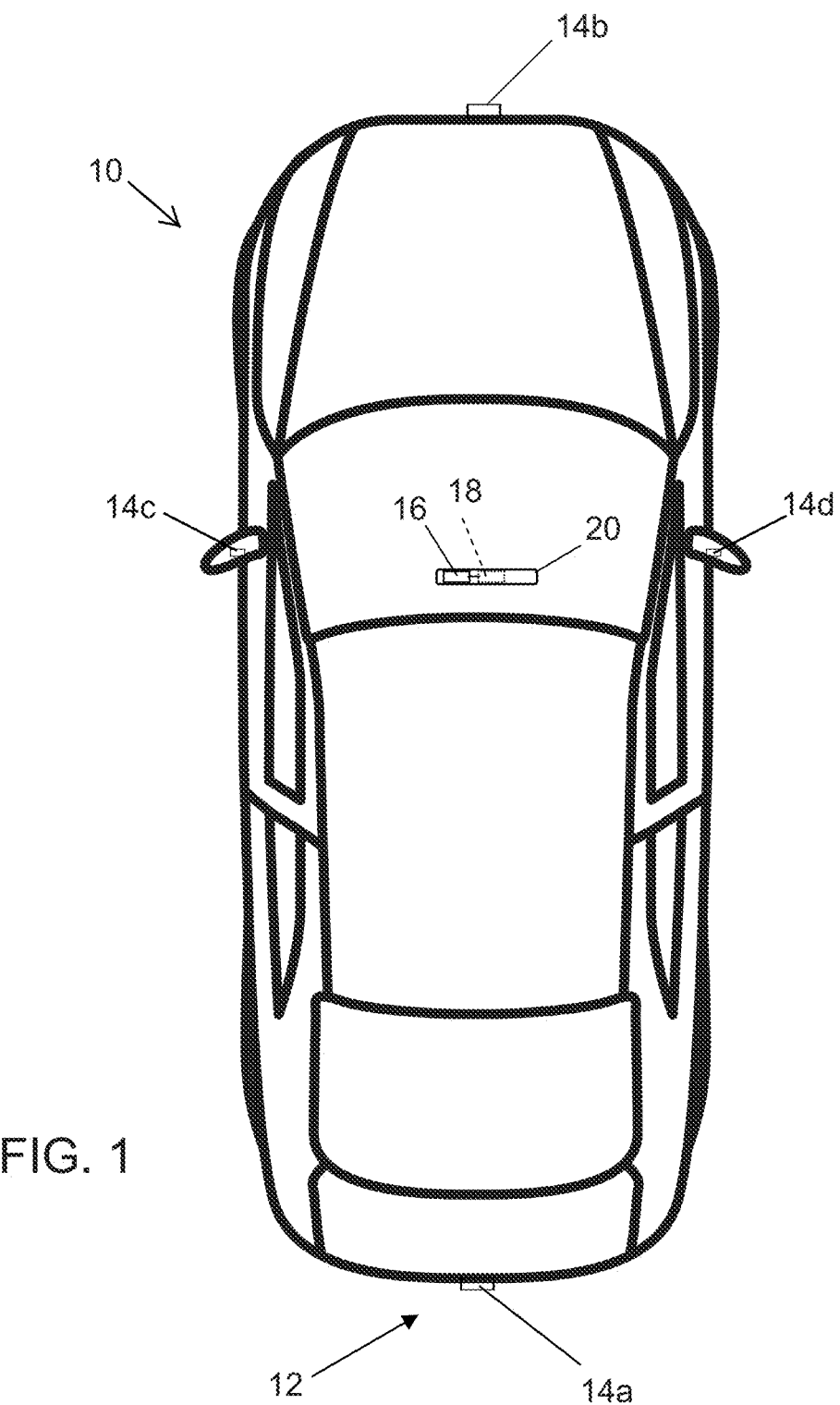
FIG. 1 is a plan view of a vehicle with a vision system that incorporates cameras in accordance with the present invention.

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

As shown in FIGS. 2-4, an exterior camera 14 is fixedly mounted at an exterior portion of the vehicle so as to have an exterior field of view. A clear lens or cover 22 is disposed at least partially around the camera and in front of the camera lens and imager. The clear lens comprises a generally cylindrical or partially cylindrical transparent element (such as a plastic element or the like) and is movable or rotatable or pivotable relative to one or more wiping elements 24 that extend across and contact the clear lens above and/or below the region or aperture that the camera views through (or optionally at or outboard of one or both side regions of the camera's field of view).

Thus, when the clear lens is pivoted or rotated relative to the fixedly mounted or non-moving camera, a portion of the lens is swept or wiped by a respective one of the wiping elements 24. For example, if the clear lens is pivoted or rotated clockwise (as viewed in FIG. 3), an upper portion of the clear lens may be wiped or cleaned, and if the clear lens is pivoted or rotated counter-clockwise (as viewed in FIG. 3), a lower portion of the clear lens may be wiped or cleaned. In the illustrated embodiment, the lens may pivot about 45 degrees clockwise from a nominal or central location and about 45 degrees counter-clockwise from the nominal or central location, in order to clean the entire clear lens in front of the camera.

Optionally, and desirably, the element may pivot more than 45 degrees each way, such that, regardless of which direction the element is pivoted, the entire portion of the element that was being viewed through by the camera is wiped by a respective wiping element, while another portion of the element that will be viewed through by the camera after the element is pivoted is wiped by the other wiping element. Thus, the clear lens or element may episodically oscillate back and forth to repeatedly provide a clean clear lens or element portion in front of the camera.

Optionally, the clear lens may rotate 360 degrees and may, when operated, continuously rotate in that manner, whereby both the upper and lower wiping elements wipe and clean the moving clear lens. If the clear lens is a full cylinder shape and rotates 360 degrees, the cable or wiring 26 of the camera would be routed through an end of the clear lens assembly (such as through an aperture in a circular wall at one of the ends of the cylindrical lens) so as to not interfere with the surrounding clear lens around the camera.

The clear lens may be rotated or pivoted via a motor 28 disposed at one of the sides or ends 22a of the generally cylindrical-shaped clear lens 22 (such as an end opposite an open end where camera cabling or wiring is routed). For example, a motor may engage an end wall or structure of the clear lens and rotate the lens about a longitudinal axis of the lens. The motor may be actuated responsive to a user input or when rain or snow or precipitation is sensed (such as by a rain sensor of the vehicle) or responsive to image processing of image data captured by the camera (when such image processing determines contaminants present in front of and in the field of view of the camera). Optionally, for a rearward viewing backup assist camera, the motor may be actuated to rotate the cover element responsive to the vehicle being shifted into a reverse gear so that the cover element is cleaned each time the backup camera is operated.

The camera and movable or rotatable cover element may be part of a camera module that includes a housing or bracket that is mounted at an exterior portion of the vehicle so that the camera is fixed relative to the vehicle and views through an aperture of the exterior portion of the vehicle. The module includes the rotatable cover element rotatably mounted at the housing that attaches to the vehicle (with the cover element rotatably attaching at the housing via any suitable means, such as via an axle that extends from an end wall of the cylindrical cover element). The cylindrical cover element thus rotatably attaches at the housing, while the camera is fixedly attached at the housing, such as via a bracket that extends through an end region of the cover element and fixedly attaches the camera relative to the housing. The housing attaches at the vehicle with an aperture of the housing corresponding with the aperture of the exterior portion of the vehicle, and with the wiping elements disposed at edges of the housing at opposite sides of the opening. The motor is attached at the housing and is operable to rotatably drive the cylindrical cover element (such as via engaging a mounting axle of the cylindrical cover element or via engaging an end wall of the cylindrical cover element that is at an opposite end of the cover element from the bracket that fixedly mounts the camera to the housing) so that the wiping elements wipe the cylindrical cover element to clean portions of the cover element.

Thus, the clear lens may rotate in front of the fixedly mounted or non-moving camera to continuously or constantly wipe the lens and keep the area in front of the camera lens clear, such as during rain or snow or the like. If the mechanical wipe mechanism failed, the clear lens would still allow the camera to continue to function. The camera or camera module is fixedly mounted or attached relative to the vehicle with its field of view fixed, and with the clear lens or element movable relative to the fixed camera to provide cleaning of the lens or portion of the lens that is at that time disposed in front of the camera and viewed through by the fixed or non-moving camera. Optionally, the camera may be adjustably mounted at the vehicle, such as to provide a tilt or pan feature, with the lens or element pivotable or rotatable relative to the camera.

The camera of the present invention thus provides a means to continuously keep the full video mirror camera area clear of obstruction (such as dirt or debris or other contaminants at or in front of the lens of the camera). Also, the clear lens becomes a fail-safe mechanism in case the mechanical aspect of the wipe fails.

When disposed at the exterior portion of the vehicle, the camera is stationary, while the clear lens is the component that can rotate or pivot relative to the camera. The clear lens may rotate partially or fully, or may move clockwise to clear part of the lens or cover and then move counter-clockwise to clear the other part of the lens or cover. For example, the clear lens could rotate or move one direction to be wiped at an upper or top portion (or first side portion if oriented with a generally vertical pivot axis) of the lens and then could rotate or move the opposite direction to be wiped at a lower or bottom portion (or other side portion) of the lens to ensure system redundancy. The camera or camera module or assembly may be disposed at the vehicle so that the clear lens or cover element rotates about a generally horizontal axis (with the wiping elements comprising generally horizontally oriented elements), such as shown in FIGS. 2-4, or the camera or camera module or assembly may be disposed at the vehicle so that the clear lens or cover element rotates about a generally vertical axis (with the wiping elements comprising generally vertically oriented elements), or the camera or camera module or assembly may be disposed at the vehicle so that the clear lens or cover element rotates about any suitably oriented axis of rotation.

Optionally, the cover element may be rotated in one direction (such as, for example, in the clockwise direction in FIG. 4) so that the upper wiping element wipes the entire portion of the cover element that was disposed in front of and viewed through by the camera, while a new portion is moved into place in front of the camera (and is wiped by the lower wiping element as the cover element is rotated). The cover element may then later be rotated in the opposite direction so that the lower wiping element wipes the entire portion of the cover element that was disposed in front of and viewed through by the camera, while the initial portion (that was previously in front of the camera) is moved back into place in front of the camera (and is wiped by the upper wiping element as the cover element is rotated). The cover element may alternatingly and episodically rotate back and forth in this manner to provide a clean portion of the cover element in front of the camera.

Optionally, the camera system may include additional means for cleaning the clear lens, such as a water or fluid or air spraying device that is operable to spray a portion of the clear lens to enhance cleaning or clearing of dirt or contaminants at the clear lens. The lens cleaning system may utilize aspects of the systems described in U.S. Pat. Nos. 9,319,637 and/or 7,965,336, and/or U.S. Publication Nos. US-2016-0272163; US-2016-0264064; US-2014-0232869 and/or US-2014-0104426, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera module for a vision system for a vehicle, said camera module comprising:

a camera fixedly disposed at an exterior portion of a vehicle so as to have a field of view exterior of the vehicle, wherein said camera comprises a lens having a central axis, and wherein said camera views through an aperture at the exterior portion of the vehicle;

a cover assembly comprising a mounting portion and a transparent cover element rotatable relative to said mounting portion;

wherein said transparent cover element comprises a cylindrically curved element;

wherein said mounting portion is mounted at the exterior portion of the vehicle so that a cylindrically curved portion of said transparent cover element is disposed at the aperture at the exterior portion of the vehicle;

wherein said cylindrically curved element of said transparent cover element surrounds said camera with the cylindrically curved portion of said transparent cover element disposed in front of said lens of said camera so that said camera views through the cylindrically curved portion of said transparent cover element;

at least one wiping element that engages an exterior surface of said transparent cover element; and wherein said transparent cover element is rotatable relative to said camera about a longitudinal axis of said transparent cover element to move the cylindrically curved portion of said transparent cover element across said at least one wiping element to clean dirt or contaminants from said transparent cover element;

wherein the longitudinal axis of said transparent cover element is parallel to the cylindrically curved portion of said transparent cover element and orthogonal to the central axis of said lens of said camera; and wherein said cylindrically curved element is fully rotatable about said longitudinal axis to clean the entirety of said transparent cover element with said at least one wiping element.

2. The camera module of claim 1, wherein said at least one wiping element comprises two wiping elements that engage opposite regions of said transparent cover element at or near opposite sides of the aperture.

3. The camera module of claim 2, wherein said transparent cover element is rotatable in a first direction and a second direction opposite the first direction, and wherein, when said transparent cover element is rotated in the first direction, one of said wiping elements cleans the cylindrically curved portion of said transparent cover element that was in front of said lens of said camera, and wherein, when said transparent cover element is rotated in the second direction, the other of said wiping elements cleans the cylindrically curved portion of said transparent cover element that was in front of said lens of said camera.

4. The camera module of claim 3, wherein said transparent cover element is rotatable at least 45 degrees in either direction.

5. The camera module of claim 1, wherein said camera module is part of a multi-camera vision system of the vehicle.

6. The camera module of claim 5, wherein said camera module of said multi-camera vision system captures image data for display of a surround view of the vehicle for viewing by a driver of the vehicle.

7. The camera module of claim 1, comprising a motor operable to rotatably drive said transparent cover element relative to said camera.

8. A camera module for a vision system for a vehicle, said camera module comprising:
   a mounting portion configured to be fixedly and non-movably mounted at an exterior portion of a vehicle;
   a camera fixedly disposed at said mounting portion, wherein said camera comprises a lens having a central axis normal to an imager of said camera;
   a transparent cover element rotatably disposed at said mounting portion and rotatable relative to said mounting portion about a longitudinal axis of said transparent cover element;
   wherein the longitudinal axis of said transparent cover element is orthogonal to the central axis of said lens of said camera;
   wherein said transparent cover element comprises a cylindrically curved element;
   wherein said cylindrically curved element of said transparent cover element surrounds said camera with a cylindrically curved portion of said transparent cover element disposed in front of said lens of said camera;
   wherein, with said mounting portion mounted at the exterior portion of the vehicle, said camera views through the cylindrically curved portion of said transparent cover element and through an aperture at the exterior portion of the vehicle;
   at least one wiping element that engages an exterior curved surface of said transparent cover element;
   wherein said transparent cover element is rotatable relative to said mounting portion and said camera about the longitudinal axis of said transparent cover element to move the cylindrically curved portion of said transparent cover element across said at least one wiping element to clean dirt or contaminants from the cylindrically curved portions of said transparent cover element; and wherein said cylindrically curved element is fully rotatable about the longitudinal axis to clean the entirety of an outer curved surface of said transparent cover element with said at least one wiping element.

9. The camera module of claim 8, wherein said at least one wiping element comprises two wiping elements that engage opposite regions of said transparent cover element at or near opposite sides of the field of view of said camera.

10. The camera module of claim 9, wherein said transparent cover element is rotatable in a first direction and a second direction opposite the first direction, and wherein, when said transparent cover element is rotated in the first direction, one of said wiping elements cleans the cylindrically curved portion of said transparent cover element that was in front of said camera, and wherein, when said transparent cover element is rotated in the second direction, the other of said wiping elements cleans the cylindrically curved portion of said transparent cover element that was in front of said camera.

11. The camera module of claim 10, wherein said transparent cover element is rotatable at least 45 degrees in either direction.

12. The camera module of claim 8, wherein said camera is part of a multi-camera vision system of the vehicle, and wherein said camera of said multi-camera vision system captures image data for display of a surround view of the vehicle for viewing by a driver of the vehicle.

13. The camera module of claim 8, comprising a motor operable to rotatably drive said transparent cover element relative to said camera.

14. A camera module for a vision system for a vehicle, said camera module comprising:
   a mounting portion configured to be fixedly and non-movably mounted at an exterior portion of a vehicle;
   a camera fixedly disposed at said mounting portion, wherein said camera comprises a lens having a central axis normal to an imager of said camera;
   a transparent cover element rotatably disposed at said mounting portion and rotatable relative to said mounting portion about a longitudinal axis of said transparent cover element;
   wherein the longitudinal axis of said transparent cover element is orthogonal to the central axis of said lens of said camera;
   wherein said transparent cover element comprises a cylindrically curved element;
   wherein said cylindrically curved element of said transparent cover element surrounds said camera with a cylindrically curved portion of said transparent cover element disposed in front of said lens of said camera;
   wherein, with said mounting portion mounted at the exterior portion of the vehicle, said camera views through the cylindrically curved portion of said transparent cover element and through an aperture at the exterior portion of the vehicle;
   a motor operable to rotatably drive said transparent cover element relative to said camera;
   a first wiping element disposed at a first region of said mounting portion and a second wiping element disposed at a second region of said mounting portion, wherein said first and second regions are at opposite regions of the field of view of said camera, and wherein said first and second wiping elements engage an exterior curved surface of said transparent cover element;
   wherein said motor, when actuated, rotates said transparent cover element relative to said mounting portion and said camera about the longitudinal axis of said transparent cover element in a first direction to move a first cylindrically curved portion of said transparent cover element across said first wiping element to clean dirt or contaminants from the exterior curved surface of the first cylindrically curved portion of said transparent cover element, and when said motor is actuated another time, said motor rotates said transparent cover element relative to said mounting portion and said camera about the longitudinal axis of said transparent cover element in a second direction opposite the first direction to move a second cylindrically curved portion of said transparent cover element across said second wiping element to clean dirt or contaminants from the exterior curved surface of the second cylindrically curved portion of said transparent cover element; and wherein said cylindrically curved element is fully rotatable about the longitudinal axis to clean the entirety of said transparent cover element with said first and second wiping elements.

15. The camera module of claim 14, wherein, when said transparent cover element is rotated in the first direction, said first wiping element cleans the exterior curved surface of the first cylindrically curved portion of said transparent cover element that was in front of said camera, and wherein, when said transparent cover element is rotated in the second direction, said second wiping element cleans the exterior curved surface of the second cylindrically curved portion of said transparent cover element that was in front of said camera.

16. The camera module of claim 15, wherein said transparent cover element is rotatable at least 45 degrees in either direction.

\* \* \* \* \*